Feb. 13, 1934.  P. J. FITZGERALD  1,947,385
GRINDING MILL ATTACHMENT FOR AN ELECTRIC UTILITY DEVICE
Filed Feb. 6, 1933   3 Sheets-Sheet 1
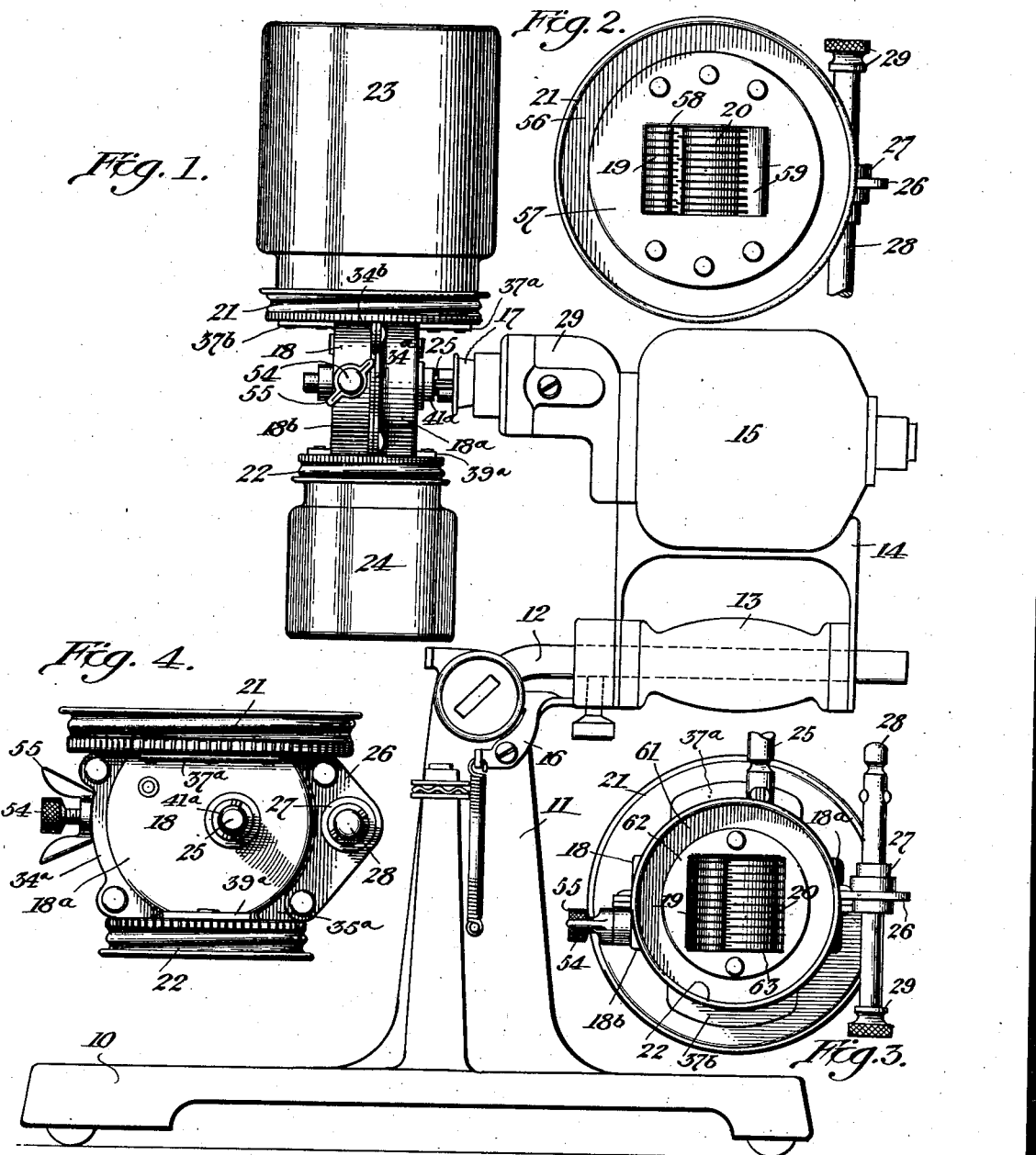
Inventor,
Patrick J. Fitzgerald.
By Sturtevant, Mason + Porter
Attorneys Feb. 13, 1934.  P. J. FITZGERALD  1,947,385
GRINDING MILL ATTACHMENT FOR AN ELECTRIC UTILITY DEVICE
Filed Feb. 6, 1933  3 Sheets-Sheet 2

Inventor,
Patrick J. Fitzgerald.
By Sturtevant, Mason + Porter
Attorneys

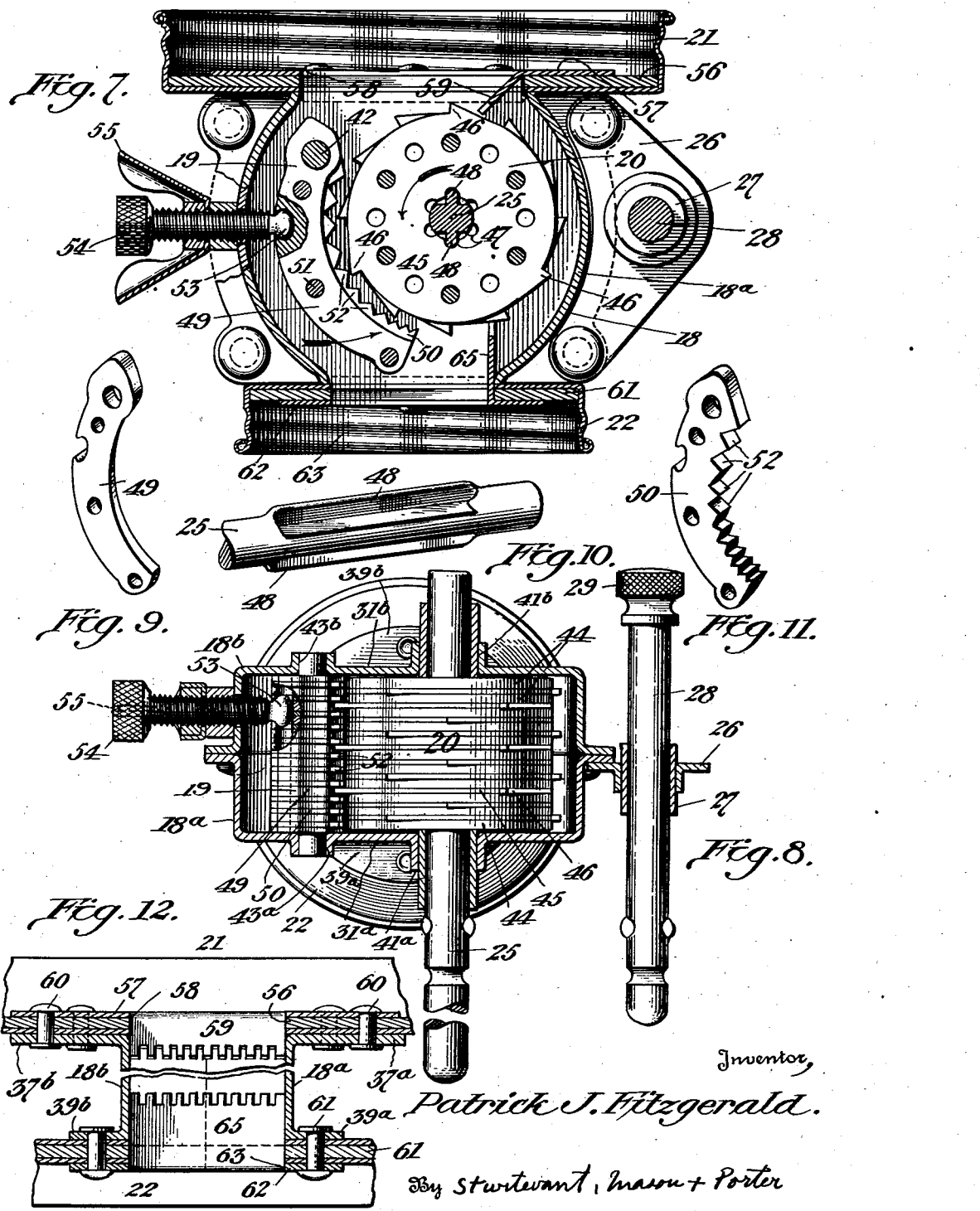

Patented Feb. 13, 1934

1,947,385

UNITED STATES PATENT OFFICE 1,947,385

GRINDING MILL ATTACHMENT FOR AN ELECTRIC UTILITY DEVICE

Patrick J. Fitzgerald, Torrington, Conn., assignor to The Fitzgerald Manufacturing Company, Torrington, Conn., a corporation of Connecticut Application February 6, 1933. Serial No. 655,508

4 Claims. (Cl. 83—18)

This invention relates to improvements in an electric utility device adapted to be used as a domestic appliance, and more particularly the invention aims to provide an improved attachment for such a device and improved means for connecting said attachment thereto.

An object of the present invention is to provide a domestic appliance wherein an electric motor having driving chucks is pivotally mounted on a supporting frame and wherein a coffee grinding or similar attachment is adapted to be operatively connected to said driving chucks whereby to conveniently perform certain grinding operations.

A further object of this invention is to provide a coffee grinding or similar attachment for an electric utility device, of the type referred to, wherein the attachment is entirely supported by suitable connection with the driving chucks of the electric motor whereby to prevent tilting thereof.

A still further object of the invention is to provide a coffee grinding or similar attachment for an electric utility device, of the type referred to, wherein said attachment is provided with means for supporting suitable receptacles in proper relation thereto in order to deliver material from one receptacle to the grinding mechanism and to receive the finished product therefrom in another receptacle.

The invention still further aims to provide an electric utility device having an attachment, of the type referred to, which is easily operated and which is thoroughly efficient in operation. The invention also provides a device, of the character described, which is inexpensively manufactured and readily assembled.

These and other objects of the invention will be obvious and will be hereinafter more fully described.

In the drawings:

Fig. 1 is a side elevation of the completely assembled device.

Fig. 2 is a top plan view of the attachment with larger receptacle removed.

Fig. 3 is a bottom view of the same with the smaller receptacle removed.

Fig. 4 is a side view of the grinding attachment with both receptacles removed.

Fig. 7 is a side view, in section, showing the grinding attachment.

Fig. 8 is a top plan view of the same, partly in section.

Figs. 9, 10, 11 and 12 are detail views of the various parts of the grinding attachment.

Figures 5, 6:
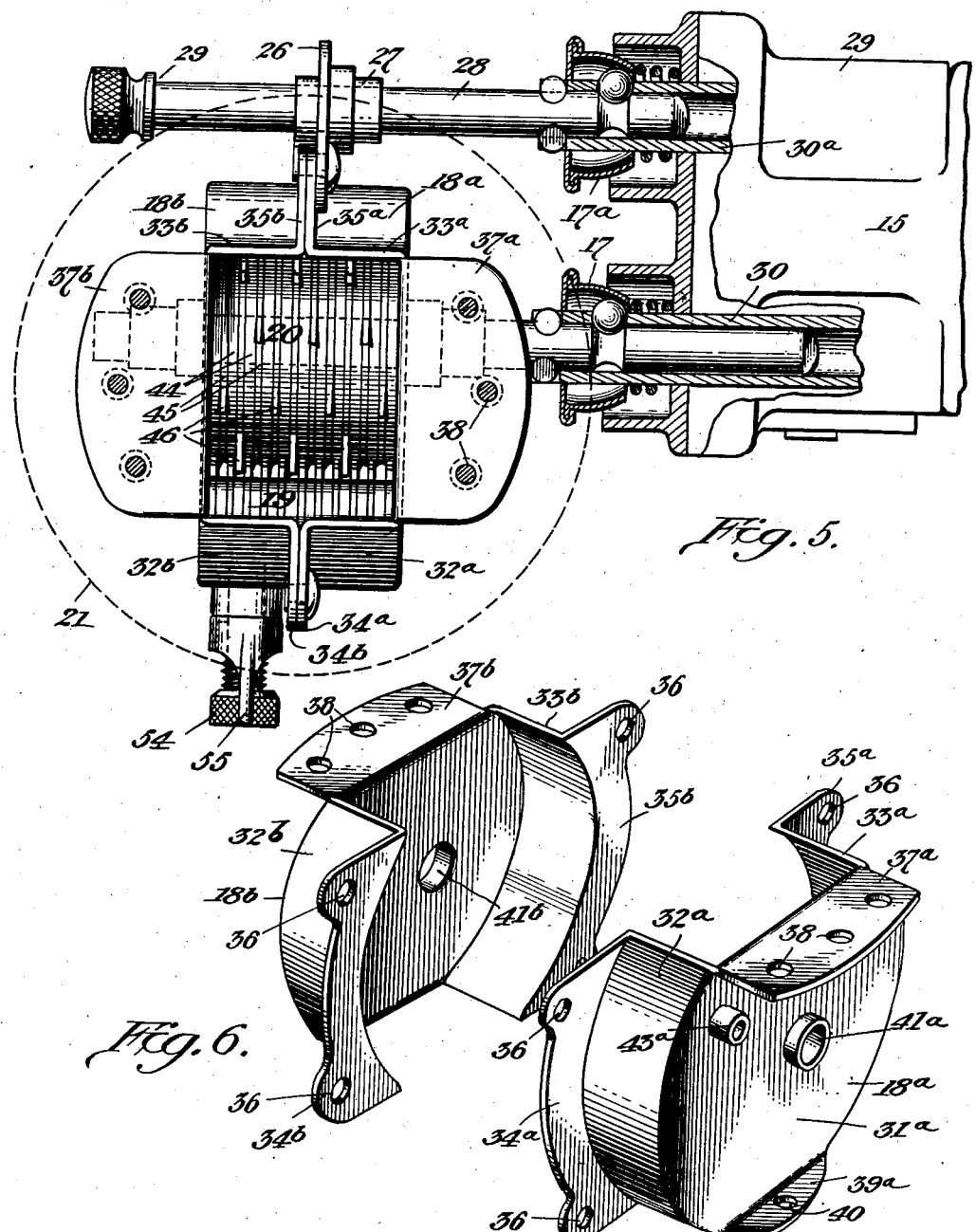
Fig. 5 is a top plan view of the attachment, showing the manner in which it is connected to the electric motor.
Fig. 6 is a detail perspective view of the casing which encloses the grinding mechanism.

Referring more in detail to Fig. 1 of the accompanying drawings, a frame or base 10 is provided with an upright post 11 thereon. A swinging arm 12 is pivotally mounted in the top of the post 11 and has mounted thereon a handle member 13 to which is secured a bracket 14 which is adapted to support an electric motor 15. The details of the pivotal connection between the arm 12 and the post 11 are described in my copending application entitled Electrical utility device, filed April 12, 1932, and bearing Serial Number 604,844. It is sufficient to say that the catch 16 pivoted to the post 11 is adapted to normally engage a horizontal shaft (not shown) to which the arm 12 is connected whereby to hold the said arm and motor in any one of several positions throughout an angle of substantially 180° thus providing several operative positions for the motor assembly in each of which a different operation may be performed. In the present instance, the arm 12 is held in a position substantially parallel to the base 10 so that the axes of the tool driving chucks 17, 17ª on the motor 15 extend horizontally and substantially parallel to said arm 12. A housing 18 consisting of two parts 18ª, 18ᵇ is adapted to enclose the grinding mechanism which comprises a stationary grinding member 19 and a rotary grinding member 20. Secured to the housing 18, at the top and bottom thereof, are threaded members 21, 22 respectively which are adapted to engage the threaded nozzles of two receptacles 23 and 24 respectively. One end of a shaft 25, upon which the rotary grinding element 20 is mounted, is adapted to be inserted in the driving chuck 17. A plate 26, which is secured to the housing 18 carries a bearing 27 through which a shaft 28 passes. One end of the shaft 28 is provided with a stop 29 and the other end is adapted to be inserted in the other driving chuck 17ª. The shaft 28 revolves in the bearing 27 but is idle in that it performs no function except to aid in supporting the grinding attachment in position and prevent the same from tilting.

The manner in which the grinding attachment is supported by the motor assembly is clearly illustrated in Fig. 5. The chucks 17, 17ª are shown connected to the gear housing 29 of the motor 15. These chucks are constructed and operate in the same manner as shown, and described in my copending application referred to above, wherein the driving shafts 30, 30ª are adapted to rotate the shafts 25 and 28 respectively. The casing 18 which encloses and supports the grinding members is illustrated in detail in Fig. 6. Each of the parts 18ª, 18ᵇ of the casing 18 is formed from a sheet metal blank and is provided with faces 31ª, 31ᵇ which have curved side walls 32ª, 33ª, 32ᵇ, 33ᵇ respectively. The side walls are provided with flanges 34ª, 35ª, 34ᵇ, 35ᵇ which have openings 36 to receive securing elements to fasten the parts of the casing together. The face portion 31ª is provided with an outwardly extending flange 37ª at the top thereof having openings 38 to receive fastening elements. Likewise the face portion 31ᵇ is provided with a similar flange 37ᵇ. At the bottom of each face 31ª, 31ᵇ is an additional outwardly extending flange 39ª, 39ᵇ respectively having suitable openings 40 to receive fastening elements. The openings 41ª, 41ᵇ in the face portions 18ª, 18ᵇ are adapted to receive the shaft 25 which supports the rotating grinding member 20. A shaft 42 which supports the stationary grinding member 19 passes through openings 43ª, 43ᵇ in the fact portions of the casing.

The rotating grinding member 20 is composed of a plurality of disks 44, 45 secured together alternately. The disks 44 are circular and the disks 45 are each provided with spaced projections 46 which form teeth. Each disk is provided with a central opening which has cut out portions 47 around the edge thereof. The shaft 25 is adapted to pass through the openings in the disks and is provided with diametrically opposite longitudinal rib portions 48 which are adapted to fit in any pair of diametrically opposite cut out portions 47 and thus secure the grinding member 20 fixedly on said shaft. The stationary grinding member 19 is composed of a plurality of arcuate members 49, 50 which are alternately mounted on the shaft 42. The arcuate members are secured together by bars 51 or other suitable means. The members 50 are provided with a number of teeth 52 and are secured so that each one registers with a smooth circular disk 44 of the grinding member 20. The arcuate members 49 are thus positioned to register with the toothed disks 45 of the rotating grinding member 20. The stationary grinding member 19 is recessed to receive the ball end 53 of a screw 54 which threadedly engages the casing 18 and is provided on the outside thereof with a locking nut 55. Thus the stationary grinding member 19 may be adjusted with respect to the rotary member 20 by adjusting the screw 54 which will oscillate the stationary member 19 about the shaft 42.

Referring to Figs. 7 and 12, the threaded member 21 is provided with an opening around which is placed a sealing disk 56 over which is placed a clamping member 57 which has an opening 58 therein to register with the opening in the member 21. The clamping member 57 is provided with a depending comb member 59 which registers with the rotating grinding member 20. The member 21 is secured to the flanges 37ª, 37ᵇ of the housing 18 by rivets 60 or the like which pass through the openings 38 in the flanges and through the sealing disk and clamping member 57. A similar sealing disk 61 is placed in the opposite threaded member 22 and a clamping plate 62 having an opening 63 therein to register with the opening in the member 22 is secured thereto by rivets 64 or the like which fasten the member 22 to the flanges 39ª, 39ᵇ of the housing 18. The clamping member 62 is also provided with an inwardly extending comb portion 65 which registers with the rotating grinding member 20. The comb members 59 and 65 serve to keep the rotating grinder clean and to prevent passage of material on the wrong side of the grinding mechanism. The sealing disks prevent moisture or extraneous matter from contaminating the material to be ground.

It is thus apparent, from the foregoing description, that the present invention provides an efficient domestic appliance which may be used for grinding coffee or the like. The grinding mechanism is enclosed within a housing 18 which is provided with threaded members 21, 22 to receive receptacles or jars 23, 24. The shaft 25 which drives the rotating grinding member 20 is adapted to be inserted in a chuck 17 of an electric motor 15 whereby to drive the member 20. The housing 18 carries a plate 26 which is provided with a bearing 27 through which a shaft 28 passes. This shaft 28 is adapted to be inserted in another chuck 17ª of the motor 15 whereby to support the grinding attachment and prevent the same from tilting. The coffee beans or other material to be ground are placed in the jar 23 which is then secured to the member 21. Another jar 24 is screwed to the member 22. When the grinding mechanism is operated, the coffee beans will pass therethrough and fall into the jar 24 in powdered form for use. The grinding mechanism may be adjusted for peculiar needs. Of course, the grinding attachment may be removed and the motor assembly may be rotated about the post 11 to other positions for the performance of other operations such as mixing or juice extracting. The grinding attachment may be easily applied to the motor assembly and in the present instance, the motor shaft is horizontal so that the jars 23 and 24 will be vertical so that the material will pass through the grinding mechanism.

It is to be understood that minor changes in details of construction may be made without departing from the scope of the invention as set forth in the appended claims.

Having thus fully described my invention, what I claim as new and desire to secure by Letters Patent, is:—

1. The combination with an electric utility device having a motor assembly including a plurality of tool driving chucks and a frame on which said motor assembly is mounted, of an attachment therefor, said attachment including a rotating grinding member and an adjustable stationary grinding member, said rotating grinding member having an operating shaft inserted in one of said chucks, and means for supporting a second shaft adapted to be inserted in another of said chucks whereby to properly support said attachment in fixed relation to said motor assembly.

2. The combination with an electric utility device having a motor assembly including a plurality of tool driving chucks and a frame on which said motor assembly is mounted, of an attachment therefor, said attachment including a housing adapted to support grinding mechanism therein, said housing having inlet and outlet openings, an operating shaft connected to one of said chucks and adapted to drive said grinding mechanism, an auxiliary shaft supported by said housing and adapted to be inserted in another of said chucks whereby to properly support said attachment, and receptacles supported by said housing and adapted to deliver and receive material to and from said grinding mechanism through the inlet and outlet openings in said housing.

3. The combination with an electric utility device having a motor assembly including a plurality of tool driving chucks and a frame on which said motor assembly is mounted, of an attachment therefor, said attachment including a housing having two similar sections, a threaded member secured to the top of said housing and adapted to support a receptacle, a second threaded member secured to the under side of said housing and adapted to support a receptacle, grinding mechanism supported within said housing and including an operating shaft adapted to be inserted in one of said chucks, a plate secured to one edge of said housing and carrying a bearing, and an auxiliary shaft passing through said bearing and adapted to be inserted in another of said chucks whereby to properly position said attachment.

4. The combination with an electric utility device having a motor assembly including a plurality of tool driving chucks and a frame on which said motor assembly is mounted, of an attachment therefor, said attachment including a housing adapted to support grinding mechanism, a threaded member secured to the top of said housing and having a sealing disk therein, a second threaded member secured to the bottom of said housing and having a similar sealing disk therein, a clamping plate within each of said threaded members and adapted to hold said sealing disks, each of said clamping plates having an inwardly extending comb member adapted to register with a rotating part of said grinding mechanism, a shaft adapted to drive said rotating part and being inserted in one of said chucks, and an auxiliary shaft mounted on said housing and adapted to be inserted in another of said chucks whereby to properly position said attachment.

PATRICK J. FITZGERALD.